(12) United States Patent
Bishara

(10) Patent No.: US 8,793,511 B1
(45) Date of Patent: Jul. 29, 2014

(54) POWER MANAGEMENT FOR POWER OVER ETHERNET (POE) SYSTEM BASED ON NETWORK COMMUNICATION TRANSMISSION RATE

(75) Inventor: Nafea Bishara, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 357 days.

(21) Appl. No.: 12/722,970

(22) Filed: Mar. 12, 2010

Related U.S. Application Data

(60) Provisional application No. 61/162,585, filed on Mar. 23, 2009.

(51) Int. Cl.
*G06F 1/00* (2006.01)
*G06F 1/26* (2006.01)

(52) U.S. Cl.
USPC .................................. 713/300; 713/320

(58) Field of Classification Search
USPC .............. 361/87, 55, 187; 713/300, 320, 340, 713/322; 347/14; 363/49; 370/419, 318, 370/295; 455/522; 709/230; 307/29
See application file for complete search history.

(56) References Cited

U.S. PATENT DOCUMENTS

| | | | | |
|---|---|---|---|---|
| 7,441,133 B2 * | 10/2008 | Giat et al. | ....................... | 713/300 |
| 7,613,939 B2 * | 11/2009 | Karam et al. | ................... | 713/300 |
| 7,631,201 B2 * | 12/2009 | Hansalia | ........................ | 713/300 |
| 7,706,392 B2 * | 4/2010 | Ghoshal et al. | ................ | 370/419 |
| 7,756,544 B1 * | 7/2010 | Graham | ......................... | 455/522 |
| 7,773,354 B2 * | 8/2010 | Apfel | ............................... | 361/55 |
| 7,774,628 B2 * | 8/2010 | Hansalia | ........................ | 713/320 |
| 7,814,340 B2 * | 10/2010 | Heath et al. | .................... | 713/300 |
| 7,832,820 B2 * | 11/2010 | Sarmast | ........................... | 347/14 |
| 7,849,333 B2 * | 12/2010 | Schindler | ...................... | 713/300 |
| 7,908,494 B2 * | 3/2011 | Hussain et al. | ................ | 713/300 |
| 7,936,546 B2 * | 5/2011 | Vorenkamp et al. | ............ | 361/87 |
| 8,001,397 B2 * | 8/2011 | Hansalia | ........................ | 713/300 |
| 8,149,602 B2 * | 4/2012 | Darshan | .......................... | 363/49 |
| 8,171,315 B2 * | 5/2012 | Karam et al. | ................. | 713/300 |
| 8,225,124 B2 * | 7/2012 | Geiger et al. | .................. | 713/340 |
| 2006/0164769 A1 * | 7/2006 | Stanford et al. | ................ | 361/87 |
| 2008/0256371 A1 * | 10/2008 | Diab et al. | ..................... | 713/300 |
| 2009/0052372 A1 * | 2/2009 | Durazzo et al. | ............... | 370/318 |
| 2009/0210725 A1 * | 8/2009 | Kim et al. | ....................... | 713/300 |
| 2012/0228936 A1 * | 9/2012 | Kabbara et al. | ................ | 307/29 |
| 2012/0287829 A1 * | 11/2012 | Chang et al. | .................. | 370/296 |
| 2012/0311169 A1 * | 12/2012 | Nakao et al. | .................. | 709/230 |

OTHER PUBLICATIONS

Adtran Inc, LLDP and LLDP-MED, Mar. 2008, pp. 1-31.*

(Continued)

*Primary Examiner* — Thomas Lee
*Assistant Examiner* — Aurel Prifti

(57) ABSTRACT

A power sourcing equipment (PSE), a powered device (PD), and an approach for managing PoE power delivered from a PSE to a PD are described. Based on communication between the PD and the PSE, the PSE reduces the power made available to the PD in response to the PD entering an operational mode with reduced power requirements. Further, based on communication between the PD and the PSE, the PSE increases the power made available to the PD in response to the PD entering an operational mode with increased power requirements.

14 Claims, 7 Drawing Sheets

(56) References Cited

OTHER PUBLICATIONS

The Institute of Electrical and Electronics Engineers, Inc.; IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access Method and Physical Layer Specifications; (Sections 1-5) IEEE Std. 802.3-2005 Dec. 9, 2005; New York, NY.

The Institute of Electrical and Electronics Engineers, Inc.; IEEE Standard for Information Technology—Telecommunications and Information Exchange Between Systems—Local and Metropolitan Area Networks—Specific Requirements; Part 3: Carrier Sense Multiple Access with Collision Detection (CSMA/CD) Access method and Physical Layer Specifications; IEEE Std. 802.3af-2003 (Amendment to IEEE Std. 802.3-2002) Jun. 18, 2003; New York, NY.

* cited by examiner

POWER MANAGEMENT FOR POWER OVER ETHERNET (POE) SYSTEM BASED ON NETWORK COMMUNICATION TRANSMISSION RATE

INCORPORATION BY REFERENCE

This application claims the benefit of U.S. Provisional Application No. 61/162,585, "ENHANCED SYSTEM LEVEL POWER MANAGEMENT WITH PoE SYSTEM," filed by Nafea Bishara, on Mar. 23, 2009, which is incorporated herein by reference in its entirety.

BACKGROUND

Power over Ethernet, or PoE, technology describes an approach that is used to transfer electrical power, along with data, from a power service equipment, or PSE, to a powered device, or PD, over a network communication cable, such as a standard category 5 network communication cable used in Ethernet networks. For example, the IEEE 802.3af PoE standard provides up to 15.4 W of DC power (minimum 44 VDC and 350 mA) to each device. The IEEE 802.3 at PoE standard provides up to 25 W of power. In addition to such PoE standards, numerous non-standard schemes, implemented by industry prior to adoption of the PoE standards, are still in use.

A PoE enabled PSE is a network infrastructure device, e.g., a switch, router, hub, etc., that provides network connectivity and PoE power to another network infrastructure device and/or network cable infrastructure end-device. A PoE enabled PD is a network cable infrastructure end-device, such as a computer, a camera, a radio-based network access point etc., that receives PoE power from a PSE over the network cable infrastructure.

A PoE enabled PSE may include both PoE enabled ports and non-POE enabled ports and may provide network communication connectivity to both PoE enabled and non-POE enabled devices. A PoE enabled port is capable of distinguishing between PoE enabled and non-POE enabled devices, and provides PoE power only to those devices capable of receiving PoE power.

The background description provided herein is for the purpose of generally presenting the context of the disclosure. Unless otherwise indicated herein, the approaches described in this section are not prior art to the claims in this application and are not admitted to be prior art by inclusion in this section.

SUMMARY

A power sourcing equipment (PSE), a powered device (PD), and an approach for managing PoE power delivered from a PSE to a PD are described. Based on communication between the PD and the PSE, the PSE reduces the power made available to the PD in response to the PD entering an operational mode with reduced power requirements. Further, based on communication between the PD and the PSE, the PSE increases the power made available to the PD in response to the PD entering an operational mode with increased power requirements. By tailoring power allocated to PDs based on the dynamically changing operational requirements, and/or based on optional load components that may be dynamically applied to the respective PDs, the PSE can efficiently allocate a finite PSE power supply to meet the power requirements of a greater number of PDs than could otherwise be met.

For example, in one example embodiment, a PSE, on receiving an indication from a PD that the PD has entered into an idle state characterized by a reduced network communication transmission rate, and hence a reduced power requirement, the PSE may reduce the PoE power allocated to the PD. On receiving an indication from a PD that the PD intends to resume high speed transmission, the PSE may increase the PoE power allocated to the PD. However, the described PSE, PD, and the described approach are not limited to any one type of PoE power level adjustment. The described PSE, PD, and the described approach for managing PoE power allocations, allows a PSE to flexibly and intelligently adapt PoE power allocations to both conserve PoE power resources and to efficiently allocate PoE power resources in response to any type or number of events that change PD PoE power demands.

In one example embodiment, a PoE power service equipment is described that includes, a PSE PoE manager that monitors a status of a PoE powered device that receives PoE power from the power service equipment, the PSE PoE manager including, an interface module for receiving data transmitted from the PoE powered device, and a power level module that determines a power requirement for the PoE powered device based, at least in part, on data received from the PoE powered device, and a PoE power source that adjusts an amount of PoE power delivered to the PoE powered device based on the determined power requirement.

In a second example embodiment, a PoE powered device is described that includes, a power converter that receives PoE power from a PoE power service equipment and uses the received power to power the PoE powered device based on an initial power level received from the PoE power service equipment, and a PD PoE manager that monitors a status of the PoE powered device, the PD PoE manager including, a PD controller that receives a status update from one of a PD transceiver, a PD processor and a PD load component indicating a change in operational status, and an interface module that generates data based at least in part on the received change in operational status for transmission to the PoE power service equipment from which the PoE powered device receives power.

In a third example embodiment, a method performed by a power service equipment to manage power provided to a PoE powered device by the power service equipment is described that includes, monitoring a status of the PoE powered device based on data transmitted from the PoE powered device, determining a power requirement for the PoE powered device based, at least in part, on data received from the PoE powered device, and adjusting an amount of PoE power delivered to the PoE powered device based on the determined power requirement.

BRIEF DESCRIPTION OF THE DRAWINGS

Examples of power sourcing equipment (PSE), examples of powered devices (PDs), and example approaches for managing PoE power delivered from a PSE to a PD, will be described with reference to the following drawings, wherein like numerals designate like elements.

DETAILED DESCRIPTION OF EMBODIMENTS

Figure 1:
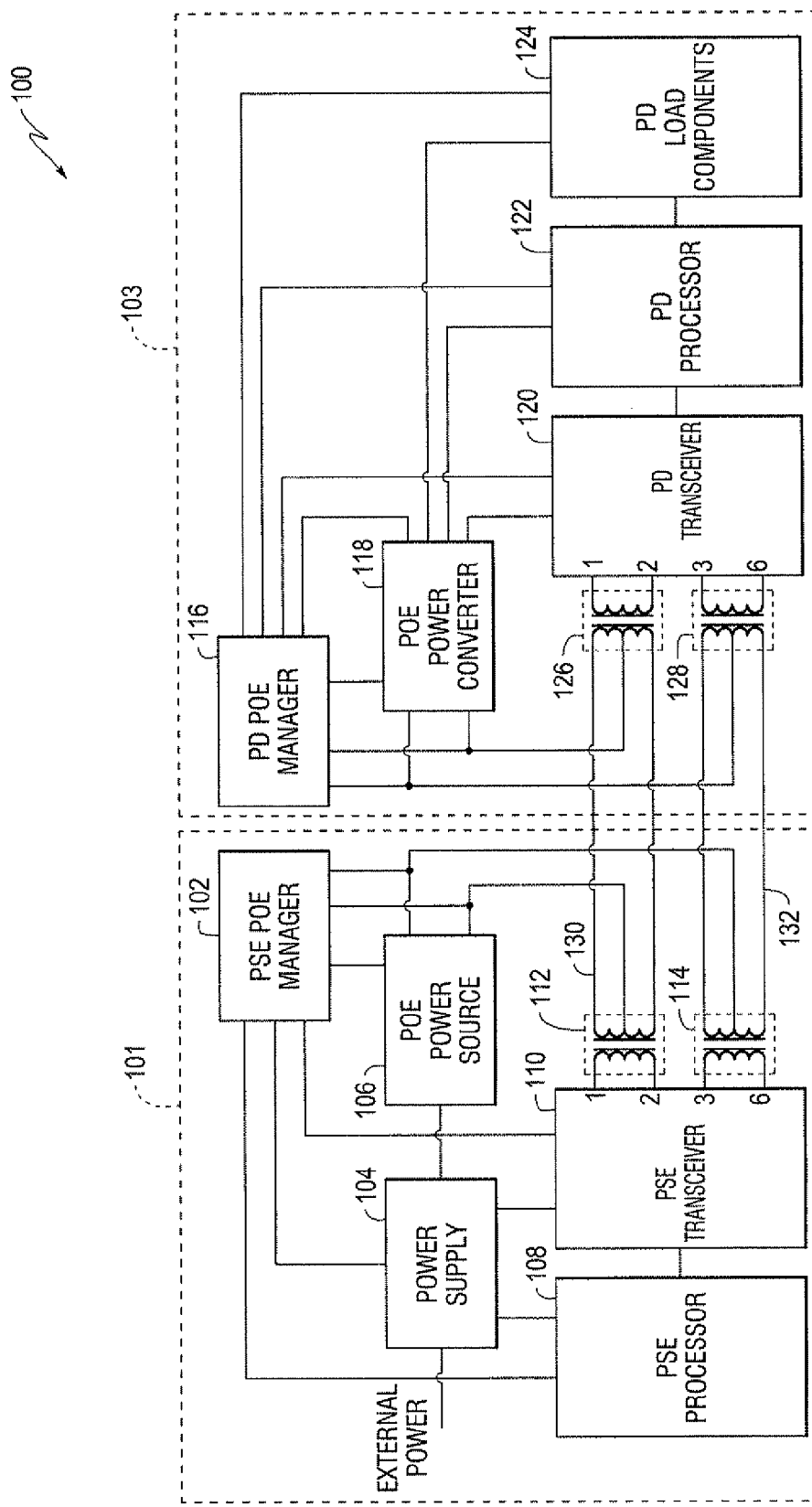
FIG. 1 is a schematic diagram of an example PoE system in which an example embodiment of a PSE provides power to an example embodiment of a PD using PoE.

FIG. 1 is a schematic diagram of an example PoE system 100 in which an example embodiment of a PSE 101 provides power to an example embodiment of a PD 103 using PoE. As shown in FIG. 1, PSE 101 includes a PSE PoE manager 102, a power supply 104, a PoE power source 106, a PSE processor 108, a PSE transceiver 110, a PSE capacitive signal first coupling transformer 112, and a PSE capacitive signal second coupling transformer 114. As further shown in FIG. 1, PD 103 includes a PD PoE manager 116, a POE power converter 118, a PD transceiver 120, a PD processor 122, one or more PD load components 124, a PD capacitive signal first coupling transformer 126, and a PD capacitive signal second coupling transformer 128.

During operation, PSE PoE manager 102 dynamically controls the PoE power applied by PoE power source 106 to selected Ethernet cable wire-pairs of one or more PoE enabled ports based on communication between the PSE 101 and one or more PDs, as described in greater detail below. As shown in FIG. 1, PSE PoE manager 102 is powered by power supply 104, communicates with one or more of PSE processor 108, PSE transceiver 110 and PoE power source 106, and monitors POE wire-pairs on each PoE enabled port to detect cable connections/disconnection, and may monitor PoE power usage over the respective PoE enabled ports, as described in greater detail below.

Power supply 104 receives power from an external power source, not shown, and converts and/or conditions the received power. As shown in FIG. 1, the converted/conditioned power is then used to power PSE PoE manager 102, PoE power source 106, PSE processor 108, and PSE transceiver 110.

PSE power source 106 receives power from power supply 104 and converts and/or conditions the power to produce a PoE DC voltage power signal that is transmitted to powered device 103 via selected PoE wire-pairs, e.g., first PoE power transmission wire-pair 130 and second PoE power transmission wire-pair 132, associated with a PoE enabled port. In one example embodiment, PoE power source 106 dynamically allocates power to a PoE enabled port based on configuration instructions received from PSE PoE manager 102, as described below. The example PoE powered wire-pair configuration shown in FIG. 1, i.e., first PoE power transmission wire-pair 130 which includes cable conductor #1 and cable conductor #2, and second PoE power transmission wire-pair 132 which includes cable conductor #3 and cable conductor #6, is consistent with the 802.3 Ethernet 10/100 Mbps convention in which power is transmitted on the same wire-pairs used to transmit and receive data signals between the PSE and PD devices. However, depending on the PoE standard selected for implementation, the cable pairs used to transmit power from the PSE to the PD may vary.

PSE transceiver 110 supports physical layer communication with a PD via network communication cable wire-pairs in accordance with a selected wire-based transmission protocol, e.g., 802.3 Ethernet 10/100 Mbps or other transmission protocol. In one example PSE 101, PSE transceiver 110 may be included in a network interface card (NIC) that supports one or more network ports, each port supporting data communication via a network communication cable that connects the port to a communication port on another device, e.g., a PD 103, as shown in FIG. 1. As further shown in FIG. 1, PSE transceiver 110 receives power from power supply 104 and communicates with one or more of PSE processor 108 and PSE PoE manager 102 to implement process flows described below with respect to FIG. 4 though FIG. 8.

PSE processor 108 provides PSE 101 with processing capabilities based on the execution of programmed instructions stored in memory and/or in firmware. With respect to the implementation of PoE management, PSE processor 108 may receiver power from power supply 104 and may communicate with PSE PoE manager 102 and PSE transceiver 110 to implement the process flows described below with respect to FIG. 4 through FIG. 8. For example, PSE processor 108 may communicate with PSE PoE manager 102 and may instruct PSE transceiver 110 to transmit PoE related messages generated by PSE PoE manager 102, e.g., LLDP compliant messages, between PSE 101 and PD 103 containing information used to dynamically manage the delivery of PoE power from PSE 101 to PD 103, as described in greater detail below. Although shown in FIG. 1 as separate modules, in on example PSE embodiment, PSE PoE manager 102, PSE transceiver 110 and PSE processor 108, may be implemented on a single integrated circuit system on a chip.

With respect to operation of PD 103, PD PoE manager 116 manages communication between PSE 101 and PD 103 related to the delivery of PoE power from PSE 101 to PD 103, as described below with respect to the process flows shown in FIG. 5 and FIG. 7. In one example embodiment, PD PoE manager 116 communicates with one or more of PD transceiver 120, PD processor 122, and one or more PD load components 124 and relays requests for increases and/or decreases in power levels to PSE 101. Further, PD PoE manager 116 may communicate with PoE power converter 118 to configure PoE power converter 118 to convert/condition PoE power received from PSE 101 to meet the respective power requirements of PD PoE manager 116, PD transceiver 120, PD processor 122, and one or more PD load components 124.

POE power converter 118 receives PoE power from PSE 101 via data network communication cable wire-pairs and converts and/or conditions the received power to meet the power requirements of one or more of PD PoE manager 116, PD transceiver 120, PD processor 122, and one or more PD load components 124, based on control signals received from PD PoE manager 116. For example, as shown in FIG. 1, PoE power converter 118 retrieves PoE power from center-taps included on PD capacitive signal first coupling transformer 126 attached to first PoE power transmission wire-pair 130 and PD capacitive signal second coupling transformer 128 attached to second PoE power transmission wire-pair 132. The PoE power may be received at a predetermined or dynamically negotiated voltage level and may be capable of providing a predetermined or dynamically negotiated maximum current at the designated voltage level. PoE power converter 118 may convert and/or condition the received PoE power to meet specific power requirements of PD PoE manager 116, PD transceiver 120, PD processor 122, and one or more PD load components 124 based on instructions received from PD PoE manager 116.

PD transceiver 120 supports physical layer communication with a PSE via network communication cable wire-pairs in accordance with a selected wire-based transmission protocol, e.g., 802.3 Ethernet 10/100 Mbps or other transmission protocol. In one example PD 103, PD transceiver 120 may be included in a network interface card (NIC) that supports a network port that supports data communication via a network communication cable that connects the port to a communication port on another device, e.g., a PSE, as shown in FIG. 1. As shown in FIG. 1, PD transceiver 120 receives power from PoE power converter 118 and communicates with one or more of PD processor 122 and PD PoE manager 116 to implement process flows described below with respect to FIG. 4 though FIG. 8.

PD processor 122 provides PD 103 with processing capabilities based on the execution of programmed instructions stored in memory and/or in firmware. With respect to the implementation of PoE management, PD processor 122 may receiver power from PoE power converter 118 and may communicate with PD PoE manager 116, PD transceiver 120 and/or one or more PD load components, as described below.

For example, PD processor 122 may communicate with PD PoE manager 116 and may instruct PD transceiver 120 to transmit PoE related messages generated by PD PoE manager 116, e.g., LLDP compliant messages, between PD 103 and PSE 101 containing information used to dynamically manage the delivery of PoE power from PSE 101 to PD 103, as described in greater detail below. Although shown in FIG. 1 as separate modules, in on example PD 103 embodiment, PD PoE manager 116, PD transceiver 120 and PD processor 122, may be implemented on a single integrated circuit system on a chip.

PD load components 124 may include any embedded component or dynamically attachable component that draws power from PoE 103. Examples of embedded components that may be included in a PD 103 that is a CCD camera are a CCD imaging device, and/or an auto-focus device. Examples of dynamically attachable components included in such an example CCD camera that may affect the PoE power requirements of the PD may include such items as an optional, large-sized memory chip, a flash-drive or a remote controlled pivoting base. The PoE power requirements of a PoE enabled port may change based on the nature of the PD attached to the port and/or the dynamically configurable components with which the PD is configured. As the PoE requirements of the PD 103 change, the PD 103 may negotiate with PSE 101 to received either a decreased or increased PoE power allocation, as described in greater detail below.

Figure 2:
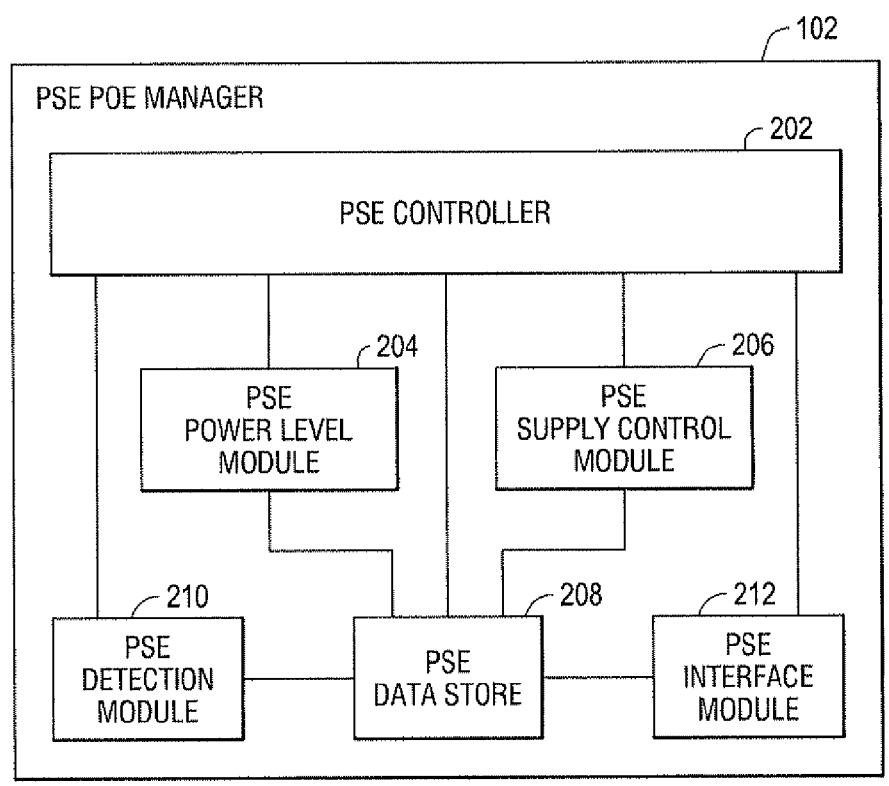
FIG. 2 is block diagram of an example PSE PoE manager included in the PSE shown in FIG. 1.

FIG. 2 is block diagram of an example PSE PoE manager 102 included in PSE 101, described above with respect to FIG. 1. As shown in FIG. 2, PSE PoE manager 102 includes a PSE controller 202, a PSE power level module 204, a PSE supply control module 206, a PSE data store 208, a PSE detection module 210, and a PSE interface module 212.

In operation, PSE controller 202 maintains a set of static and/or dynamically updated control parameters that can be used by PSE controller 202 to invoke the other modules included PSE PoE manager 102 to perform operations, as described below, in accordance with the control parameters and a set of predetermined process flows, such as those described below with respect to FIG. 4 through FIG. 8. PSE controller 202 may communicate with and receive status updates from the respective modules within PSE PoE manager 102 to allow PSE controller 202 to control operation of PSE 101 in support of the respective process flows.

PSE data store 208 is a local data store that stores a defined set of data, or protocol data unit (PDU), for each PoE enabled port supported by the PSE. The data included in each PoE enabled port PDU includes configuration data and status information that is used to control operation of the port, as described below. For example, in one example embodiment, each PoE port PDU may include such values as a port identifier, a port maximum PoE voltage, a port maximum PoE current, a port maximum PoE power, and a port connection status. In addition, the PoE port PDU may also include information about a PoE PD connected to the port such as a PD type, a present port PoE voltage, a present port maximum PoE current, a present port maximum PoE power, a requested port PoE voltage, a requested port maximum PoE current, and a requested port maximum PoE power. A description of such example PSE PDU parameters is provided in Table 1.

TABLE 1

Example PSE PDU Parameters

| Example PSE PDU Parameter | Description |
| --- | --- |
| PSE_port_identifier | Unique PSE port identifier |
| PSE_port_maximum_POE_voltage | Maximum voltage that PSE will allow to be applied to port identified with port_identifier under any condition |
| PSE_port_maximum_POE_current | Maximum current that PSE will allow to pass through port identified with port_identifier under any condition |
| PSE_port_maximum_POE_power | Maximum total power that PSE will allow to pass through port identified with port_identifier under any condition |
| PSE_port_connection_status | Indicates whether the port identified with port_identifier is connected to a PD |
| PD_type | Associates a PD connected to port identified with port_identifier with a set of PD power requirements, e.g., initial power requirements and/or predefined power levels |
| PD_present_port_POE_voltage | Present voltage applied by PSE to port identified with port_identifier |
| PD_present_port_maximum_POE_current | Present maximum current that will be allowed by PSE to pass through port identified with port_identifier at present voltage |
| PD_present_port_maximum_POE_power | Present maximum power that will be allowed by PSE through port identified with port_identifier |

TABLE 1-continued

Example PSE PDU Parameters

| Example PSE PDU Parameter | Description |
| --- | --- |
| PD_requested_port_POE_voltage | Voltage requested by PD for application to port identified with port_identifier |
| PD_requested_port_maximum_POE_current | Maximum current requested by PD for application to port identified with port_identifier at requested voltage |
| PD_requested_port_maximum_POE_power | Maximum power requested by PD for application to port identified with port_identifier |

As described in greater detail below, portions of the PoE port PDU data stored in PSE data store 208, such as the port identifier, port maximum PoE voltage, port maximum PoE current, port maximum PoE power, may be stored as part of an initial PSE configuration process performed at the factory, and/or during installation of the PSE in a network configuration. Other portions of the PoE port PDU data stored in PSE data store 208, such as the port connection status, PD type, present port PoE voltage, present port maximum PoE current, present port maximum PoE power, requested port PoE voltage, requested port maximum PoE current, and requested port maximum PoE power, may be dynamically updated based on a current status of power being delivered from the PSE to a PD and based on PoE related communication between the PSE and PDs connected to the respective ports, as described below with respect to FIG. 5 through FIG. 8.

For example, in one example embodiment, a PSE receives data related to a PD connected to a PSE port via periodic link layer discovery protocol (LLDP) broadcasts received from the PD connected to the PSE port. The data received in the LLDP broadcast is used to update data stored in the PSE PDU for the port on which the LLDP message was received. A change in the data stored in the PSE PDU can be used to initiate action by the PSE PoE manager 102 to modify, for example, the voltage and/or maximum power assigned to a PoE enabled port, as described in greater detail below. Data exchanges between the PSE and PD devices allow the PSE to negotiate PoE power assignments to meet the actual needs of the respective PD devices to the greatest extent possible with the finite amount of PoE power available for distribution by the PSE, and allows PoE power to be conserved and/or directed elsewhere when a PD does not require a previously negotiated power level.

In one example embodiment, PSE 101 and PD 103 may share a set of predefined power levels, each predefine power level associated with, for example, a port PoE voltage, a port maximum PoE current, and a port maximum PoE power. In such an embodiment, a predefined power level, such as "processor-idle-mode" may be passed from PD 103 to intelligent PSE 101 to convey one or more of a requested port PoE voltage, a requested port maximum PoE current, and a requested port maximum PoE power. In one such embodiment, a PSE is able to retrieve over the network a lookup table containing a set of predefined power levels associate with a PD 103, based on a PD type received from the PD 103. In another embodiment, the lookup table is pre-loaded into PSE 101. In yet another embodiment, the lookup table is transmitted to PDE 101 from PD 103, immediately after startup of PD 103. Other techniques for establishing a common set of predefined power levels between a PSE 101 and a PD 103 may also be used.

PSE detection module 210 determines whether a PoE enabled PD is connected to a PoE enabled PSE port, and determines an initial PoE power level, e.g., an initial voltage and an initial maximum current, that PSE 101 is to apply to the PoE enabled port on which the new PD is detected. For example, based on established PoE techniques, PSE detection module 210 may monitor a resistance between a predetermined set of wire-pairs on a PoE enabled port. On connection of a PD to the PoE enabled port via a communication network cable, the monitored resistance will change. By comparing the new resistance to set of predefined PoE resistance ranges, PSE detection module 212 can determine wither the device connected to the PoE enabled port is a PoE enabled PD, and can further determine, again based on the measured resistance value, an initial voltage and an initial maximum current to assign to the PoE enabled port. Information determined by PSE detection module 212 may be stored in the PoE PDU for the port, e.g., as values stored in port connection status, PD type, present port PoE voltage, present port maximum PoE current, and present port maximum PoE power, stored in PSE data store 208, and may be used by PSE supply control module 206 to control the voltage and power applied to the PoE enabled port by PoE power source 106.

PSE interface module 212, coordinates communication, i.e., exchanges of data, between PSE 101 and PD 103 that are used to coordinate changes in the PoE power delivered from PSE 101 to a PD 103. In an example embodiment in which communication between PSE 101 and PD 103 is performed using LLDP, PSE interface module 212 may parse incoming LLDP messages for data, extract and store received data in the PSE PDU corresponding to the PoE port on which the LLDP message was received, and may notify PSE controller 202 of any changes in the stored data on which action is required. Further, on request from PSE controller 202, PSE interface module 212 may generate message content for inclusion in an LLDP broadcast from the PSE based on PDU data stored in PSE data store 208 for a port designated by PSE controller 202.

For example, receipt of a requested port PoE voltage, requested port maximum PoE current, and/or requested port maximum PoE power that is less than the corresponding present port PoE voltage, present port maximum PoE current, and/or present port maximum PoE power stored in the PSE PDU for the port indicates that a power reduction has been requested by the PD, and indicates that a reassessment by the PSE of the power delivered by the PSE to the PD is required. Receipt of a requested port PoE voltage, requested port maximum PoE current, and/or requested port maximum PoE power that is greater than the corresponding present port PoE voltage, present port maximum PoE current, and/or present port maximum PoE power stored in the PSE PDU for the port indicates that a power increase has been requested by the PD, and indicates that a reassessment by the PSE of the power delivered by the PSE to the PD is required. Once action has been taken by the PSE in response to such a request for an increase or decrease in PoE power, PSE controller 202 may instruct PSE interface module 212 to generate message content for inclusion in an LLDP broadcast from the PSE to the PD that includes PDU stored in PSE data store 208 that has been updated based on the PSE's response to the request. In this manner, the PD may be informed whether an outstanding request for increased or decreased power has been implemented by the PSE and may update the corresponding PD PDU in PD data store 308 to reflect the updated data received in the LLDP message.

POE power level module 204 assesses new power level data received for a port from a PD device 103, e.g., via an LLDP broadcast message transmitted from the PD 103, based on data stored in association with the port in PSE data store 208, and a knowledge of power constraints under which the PSE is configured to operate. For example, as described in greater detail below, in response to a request for additional power, PoE power level module 204 may determine whether the new power level can be granted based on a maximum threshold set for the respective PDs, current power commitments that have been made by the PSE 101, required power reserve safety margins, and the priority of the power increase request.

PSE supply control module 206 generates control signals that are sent by PSE PoE manager 102 to PoE power source 106, described above with respect to FIG. 1, based on decisions made by PoE power level module 204 regarding the granting or denying of a change in power provided to a port. For example, PoE power source 106 may increase or decrease one of an applied voltage and/or maximum current cutoff level applied by PoE power source 106 to a wire-pair associated with a port based on control signals provided by PSE supply control module 206.

Figure 3:
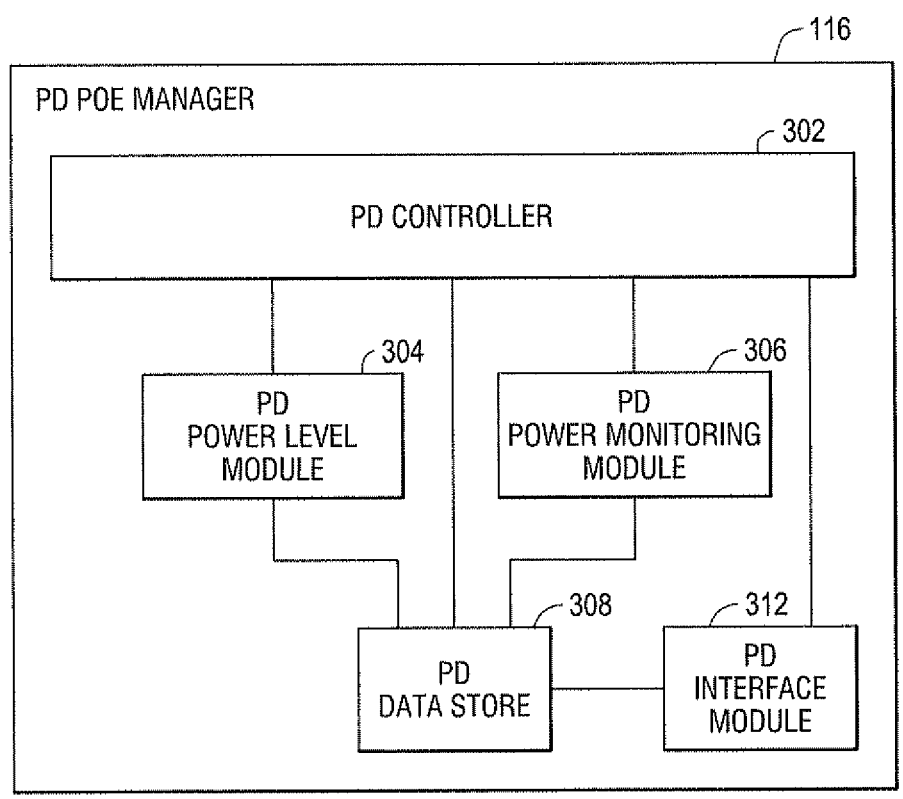
FIG. 3 is block diagram of an example PD PoE manager included in the PD shown in FIG. 1.

FIG. 3 is block diagram of an example PD PoE manager 116 included in the PD 103 shown in FIG. 1. As shown in FIG. 3, PD PoE manager 116 includes a PD controller 302, a PD power level module 304, a PD power monitoring module 306, a PD data store 308, and a PD interface module 312.

In operation, PD controller 302 maintains a set of static and/or dynamically updated control parameters that can be used by PD controller 302 to invoke the other modules included in PD PoE manager 116 to perform operations, as described below, in accordance with the control parameters and a set of predetermined process flows, such as those described below with respect to FIG. 4 through FIG. 8. PD controller 302 may communicate with and receive status updates from the respective modules within PD PoE manager 116 to allow PD controller 302 to control operation of PD 103 in support of the respective process flows.

PD data store 308 is a local data store that is used to store control data and/or descriptive data related to features and/or characteristics of PD 103. Portions of the data stored in PD data store 308 may be configured manually via a user interface. Other portions of the data stored in PD data store 308 may be dynamically maintained by, for example, PD controller 302, based on changing operational conditions. In one example embodiment, PD data store 308 contains data similar to that described above with respect to the PoE port PDU data stored in PSE data store 208, as described below, an example of which is described above with respect to Table 1. Values contained in fields such as requested port PoE voltage, requested port maximum PoE current and requested port maximum PoE power may be calculated by, for example, PD power level module 304, described below, based on power requirements updates received from one or more of PD transceiver 120, PD processor 122, and one or more PD load components 124, and values stored in PD data store 308 fields such as present port PoE voltage, present port maximum PoE current, and present port maximum PoE power, as described in greater detail with respect to FIG. 4, FIG. 5, and FIG. 7.

PD data store 308 is a local data store that stores a defined set of data, or protocol data unit (PDU), for one or more PoE enabled ports supported by the PD. Similar to a PSE port PDU described above with respect to FIG. 2, the data included in each PD port PDU includes configuration data and status information that is used to control operation of the port, which may include PoE related communication with a PSE, as described below. For example, in one example embodiment, each PD PoE port PDU may include such values as a port identifier, a port maximum PoE voltage, a port maximum PoE current, a port maximum PoE power, and a port connection status. In addition, the PoE port PDU may also include information about the PoE PD such as a PD type, a present port PoE voltage, a present port maximum PoE current, a present port maximum PoE power, a requested port PoE voltage, a requested port maximum PoE current, and a requested port maximum PoE power. A description of such example PSE PDU parameters may match those described above with respect to Table 1.

As described in greater detail below, portions of the PD port PDU data stored in PD data store 308, such as port identifier, PD type, may be stored as part of an initial configuration process performed at the factory, and/or during installation of the PD in a network configuration. Other portions of the PD port PDU data stored in PD data store 308, such as the port connection status, port maximum PoE voltage, a port maximum PoE current, a port maximum PoE power, present port PoE voltage, present port maximum PoE current, present port maximum PoE power, requested port PoE voltage, requested port maximum PoE current, and requested port maximum PoE power are dynamically updated based on a current status of power consumed by the PD and based on PoE related communication between the PD and a PSE that supplies power to the PD, as described below with respect to FIG. 5 through FIG. 8.

For example, in one example embodiment, the PD updates the PD PDU and periodically generates LLDP compliant messages that are transmitted over the PD PoE port via PD transceiver 120. Further, the PD may receive and process LLDP compliant messages transmitted from a PSE from which the PD receives PoE power. The data received in the LLDP broadcast is used to update data stored in the PD PDU for the PoE port. A change in the data stored in the PD PDU can be used to initiate action by the PD PoE manager 116 to, for example, notify load components that a requested increase in power is available for use. Data exchanges between the PD and PSE devices allow the PD to negotiate PoE power assignments to meet the actual needs of the respective PD load components based on the amount of power available from the PSE, and allows the PD to help the PSE conserve PoE power for use by other network PDs when a PD does not require a previously negotiated power level.

PD power level module 304 generates power requirements data for PD device 103 based on data stored in PD data store 308 and/or power requirements updates received from one or more of PD transceiver 120, PD processor 122, and one or more PD load components 124. In one example embodiment, the generated power level is stored in PD data store 308, e.g., as requested port PoE voltage, requested port maximum PoE current and requested port maximum PoE power, and made available to PSE PoE manager 102, as described in greater detail with respect to FIG. 5 and FIG. 7, e.g., via an LLDP broadcast from PD 103.

PD power monitoring module 306 monitors power received from PSE 101 and monitors the distribution of power from power converter 118 to verify that power is being received and distributed in a manner consistent with data stored in PD data store 308. Error conditions, such as the receipt of PoE power from a PSE that falls below negotiated voltage/power levels, e.g., due to cable loss, or such as power use by PD load components that exceeds one or more internal thresholds, or such as power use by PD load components that falls below one or more internal PD threshold levels, is reported to PD controller 302 and may be used to initiate action on the part of PD controller 302 to negotiate an increase and/or decrease in power received from the PSE.

PD interface module 312, coordinates communication, i.e., exchanges of data, between PD 103 and PSE 101 that are used to coordinate changes in the PoE power delivered from PSE 101 to PD 103. In an example embodiment in which communication between PD 103 and PSE 101 is performed using LLDP, on request from PD controller 302, PD interface module 312 may generate message content for inclusion in an LLDP broadcast from the PD based on PD port PDU data stored in PD data store 308 for a port designated by PD controller 302.

In one example embodiment of the PD 103, described above, PD controller 302 is notified by one or more of PD transceiver 120, PD processor 122 and one or more of PD load components 124 when the respective devices enter a mode that requires reduced power consumption, such as a power idle mode, a sleep mode, or a reduced data communication rate mode, or other mode that results in the PD requiring less power. In response, PD controller 302 instructs PD power level module 304 to reassess the total power requirements for PD 103 based, for example, on PD port PDU power consumption data stored in PD data store 308 and the newly received power requirements update. Next, PD controller 302 my instruct PD interface module 312 to generate an LLDP based message that notifies the PSE 101 of the reduced PD power requirement, e.g., via an LLDP broadcast message that includes reduced power requirements in one or more of requested port PoE voltage, requested port maximum PoE current, and/or requested port maximum PoE power.

In another example embodiment of the PD 103, PD controller 302 is notified by one or more of PD transceiver 120, PD processor 122 and one or more of PD load components 124 when the respective devices enter a mode that requires increased power consumption, such as a full operational mode, activation of a math co-processor, a mode that entails the PD transceiver 120 supporting a higher transmission rate that requires increased power consumption, or other mode that results in the PD requiring more power. In response, PD controller 302 instructs PD power level module 304 to reassess the total power requirements for PD 103 based, for example, on PD port PDU power consumption data stored in PD data store 308 and the newly received power requirements update. Next, PD controller 302 my instruct PD interface module 312 to generate an LLDP based message that notifies the PSE 101 of the increased PD power requirement, e.g., via an LLDP broadcast message that includes increased power requirements in one or more of requested port PoE voltage, requested port maximum PoE current, and/or requested port maximum PoE power.

Figure 4:
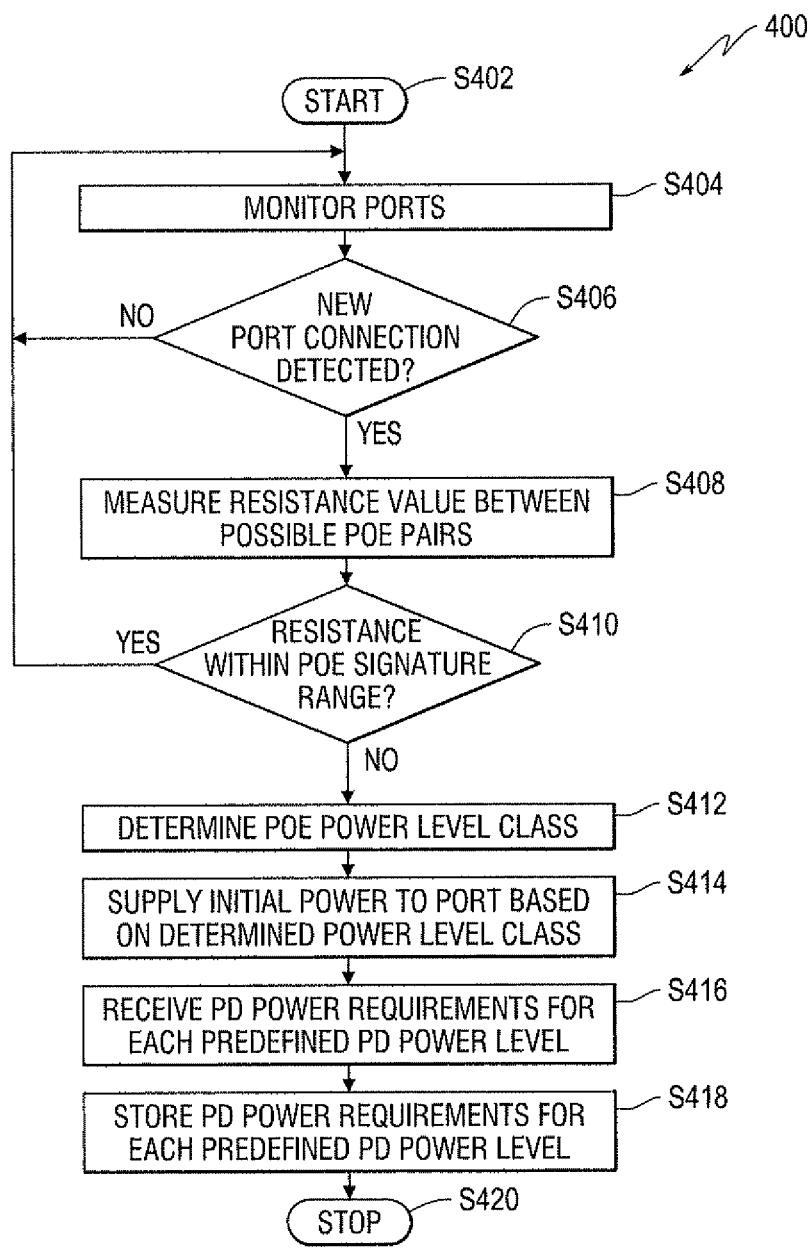
FIG. 4 a flow-chart of an example process for starting up a PD with power from a PSE.

FIG. 4 is a flow-chart of an example process for starting up a PD 103 with power from a PSE 101. As shown in FIG. 4, operation of the process begins at S402 and proceeds to S404.

At S404, PSE detection module 210 monitors PoE enabled ports provided by PSE 101 to detect connection of a network cable to one of the respective ports by, for example, monitoring a resistance between a predetermined set of wire-pairs, and operation of the process continues at S406.

At S406, if PSE detection module 210 detects that a cable has been connected to a monitored PoE enabled port, operation of the process continues at S408; otherwise, operation of the process continues at S404.

At S408, PSE detection module 210 measures the value of the resistance detected between the monitored PoE pairs, and operation of the process continues at S410.

At S410, if PSE detection module 210 determines that the measured resistance corresponds to a predetermined PoE power range, operation of the process continues at S412; otherwise, and operation of the process continues at S404.

At S412, PSE detection module 210 determines the PoE power class of the attached PD and stores the determined PoE power class in PSE data store 208, either directly or via PSE controller 202, and operation of the process continues at S414.

At S414, PSE controller 202 instructs PSE supply control module 206 to control PoE power source 106 to supply power to the port based on the voltage and power requirements associated with the determined PoE power class, and operation of the process continues at S416.

At S416, PSE controller 202 receives, e.g., via PSE interface module 212, a communication, e.g., an LLDP broadcast message, from the attached PD containing a set of one or more predefined power levels associated with the PD, and the power requirements associated with each, and operation of the process continues at S418.

At S418, PSE controller 202 stores the predefined power levels and the power requirements associated with each in PSE data store 208, and operation of the process terminates at S420.

Figure 5:
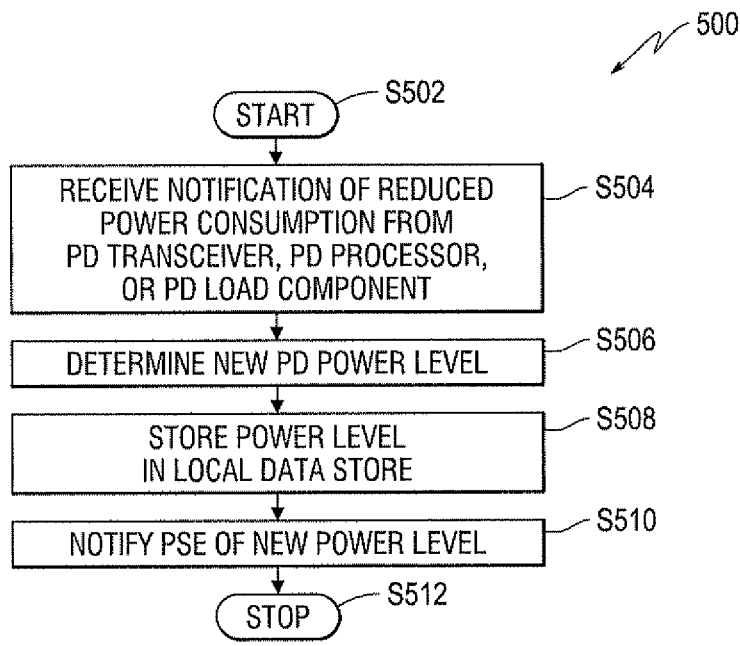
FIG. 5 a flow-chart of an example process performed by a PD to inform a PSE of a reduced PD power requirement.

FIG. 5 a flow-chart of an example process performed by a PD to inform a PSE of a reduced PD power requirement. As shown in FIG. 5, operation of the process begins at S502 and proceeds to S504.

At S504, PD controller 302 receives a notification of reduced power consumption from PD transceiver 120, PD processor 122 or a PD load component 124, and operation of the process continues at S506.

At S506, PD controller 302 invokes PD power level module 304 to determine the new PD power level for the PD, e.g., based on the prior PD power level and the reported reduction in power requirements, and operation of the process continues at S508.

At S508, PD power level module 304 stores the determined power level in PD data store 308, either directly or via PSE controller 202, and operation of the process continues at S510.

At S510, PD controller 302 initiates a broadcast message over the PD communication port via, for example, PD transceiver 120, to notify PSE 101 of the change in power requirements, and operation of the process terminates at S512.

Figure 6:
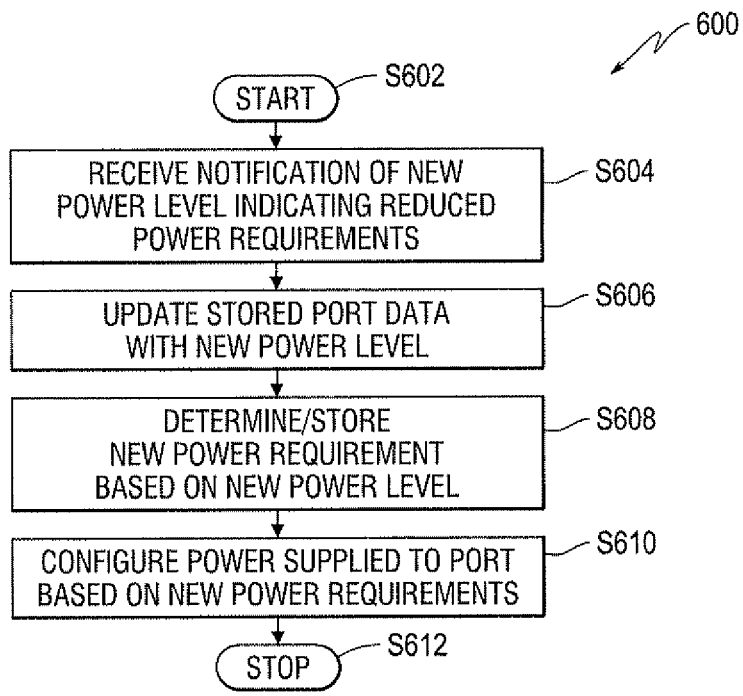
FIG. 6 a flow-chart of an example process performed by a PSE in response to being informed of a reduced PD power requirement.

FIG. 6 a flow-chart of an example process performed by a PSE 101 in response to being informed by a PD 103 of a reduced power requirement. As shown in FIG. 6, operation of the process begins at S602 and proceeds to S604.

At S604, PSE controller 202 receives a notification of a new power level indicating a reduced power requirement, and operation of the process continues at S606.

At S606, PSE controller 202 updates port data in PSE data store 208 associated with the port on which the notification is received with the new power level, and operation of the process continues at S608.

At S608, PSE controller 202 invokes PSE power level module 204 to determine the new power requirements for the PD, e.g., based on the received power level and a power level lookup table associated with the PD 103 from which the power level was received, and operation of the process continues at S610.

At S610, PSE controller 202 invokes PSE supply control module 206 to configure PoE power source 106 to provide PoE power to the PD 103 based on the determined power requirements for the port, and operation of the process terminates at S612.

Figure 7:
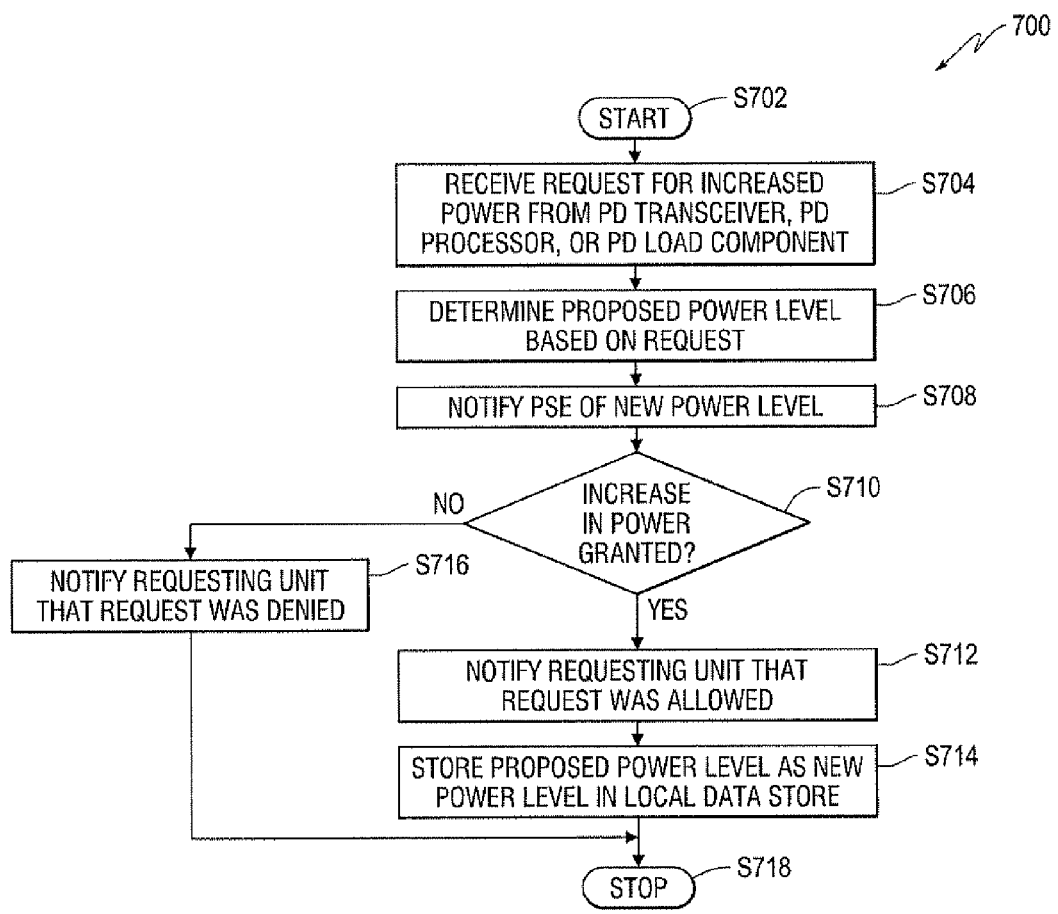
FIG. 7 a flow-chart of an example process performed by a PD to inform a PSE of an increased PD power requirement.

FIG. 7 is a flow-chart of an example process performed by a PD 103 to inform a PSE 101 of an increased PD power requirement. As shown in FIG. 7, operation of the process begins at S702 and proceeds to S704.

At S704, PD controller 302 receives a request for increased power consumption from PD transceiver 120, PD processor 122 or a PD load component 124, and operation of the process continues at S706.

At S706, PD controller 302 invokes PD power level module 304 to determine the new PD power level for the PD, e.g., based on the prior PD power level and the reported reduction in power requirements, and operation of the process continues at S708.

At S708, PD controller 302 initiates a broadcast message over the PD communication port via, for example, PD transceiver 120, to notify PSE 101 of the change in power requirements, and operation of the process continues at S710.

At S710, if PD power monitoring module 306 determines that the requested increase in power has been granted, operation of the process continues at S712; otherwise, operation of the process continues at S716.

At S716, PD controller 302 notifies the requesting PD unit, e.g., PD transceiver 120, PD processor 122 or a PD load component 124, that the requested power increase was denied, and operation of the process terminates at S718.

At S712, PD controller 302 notifies the requesting PD unit, e.g., PD transceiver 120, PD processor 122 or a PD load component 124, that the requested power increase was allowed, and operation of the process continues at S714.

At S714, PD controller 302 stores the determined granted power level in PD data store 308 in association with the PD port, and operation of the process terminates at S718.

Figure 8:
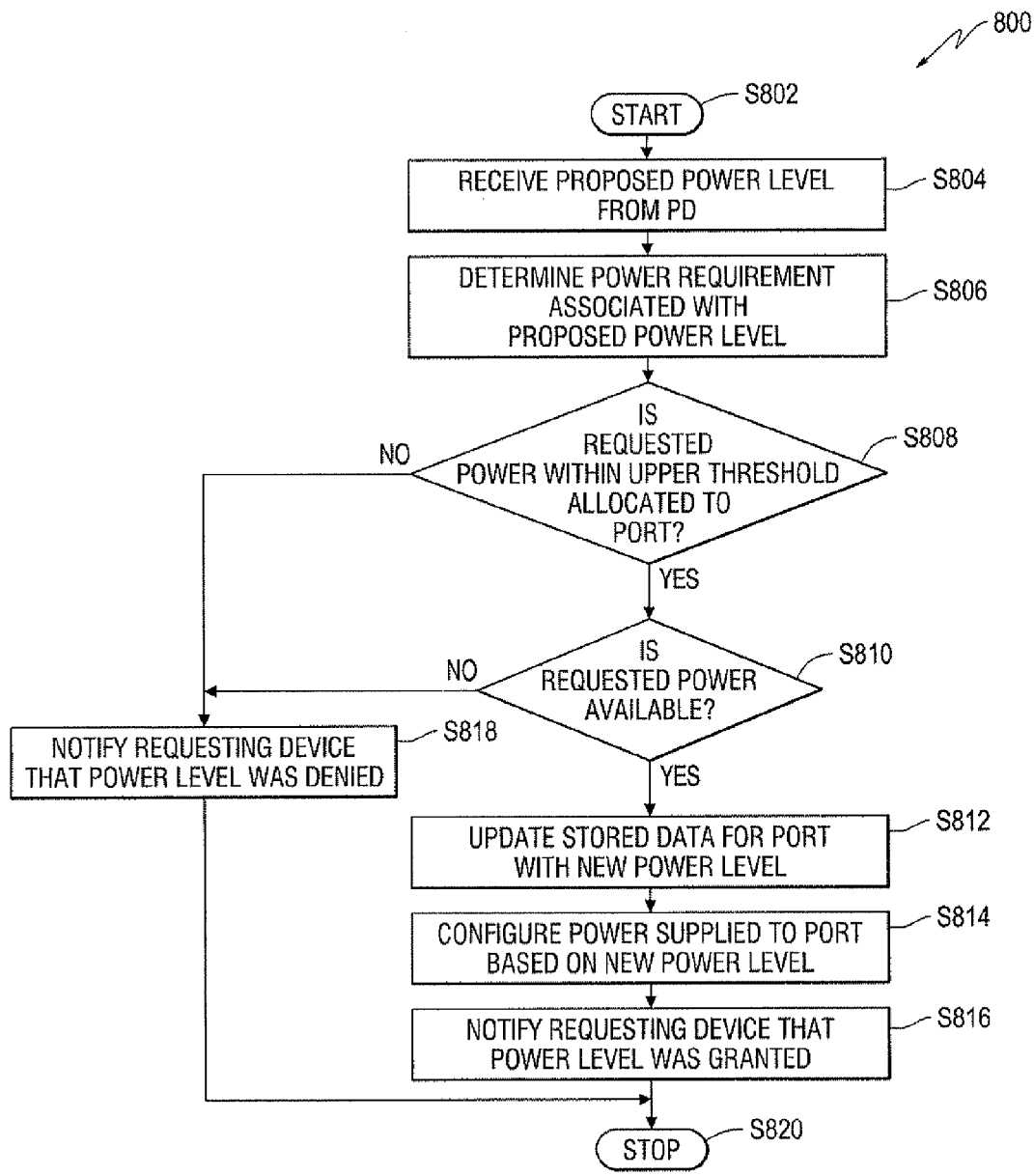
FIG. 8 a flow-chart of an example process performed by a PSE in response to being informed of an increased PD power requirement.

FIG. 8 a flow-chart of an example process performed by a PSE 101 in response to being informed of an increased PD power requirement by a PD 103. As shown in FIG. 8, operation of the process begins at S802 and proceeds to S804.

At S804, PSE controller 202 receives a request for an increased power allocation from a PD, and operation of the process continues at S806.

At S806, PSE controller 202 invokes PSE power level module 204 to determine a new power level for the PD, e.g., based on the received power level and a power level lookup table associated with the PD 103 from which the power level was received, and operation of the process continues at S808.

At S808, if PSE controller 202 determines that the determined new power level is below a maximum allowed power allocation assigned to the port, e.g., a maximum allowed power allocation stored in PSE data store 208 in association with the port, operation of the process continues at S810; otherwise, operation of the process continues at S818.

At S810, if PSE controller 202 determines that the new power level can be assigned to the PD without exceeding power safety margins maintained by the PSE, operation of the process continues at S812; otherwise, operation of the process continues at S818.

At S818, PSE controller 202 notifies the requesting PD unit that the requested power increase was not allowed, and operation of the process terminates at S820.

At S812, PSE controller 202 updates port data in PSE data store 208 associated with the port on which the notification is received with the new power level, and operation of the process continues at S814.

At S814, PSE controller 202 invokes PSE supply control module 206 to configure PoE power source 106 to provide PoE power to the PD 103 based on the updated power requirements for the port, and operation of the process continues at S816.

At S816, PSE controller 202 notifies the requesting PD unit that the requested power increase was allowed, e.g., via an LLDP message that indicates a present power level that matches the requested power level requested by the requesting PD, and operation of the process terminates at S820.

It is noted that example embodiments of PSE 101 may include a PSE PoE manager that tracks power usage by the PD 103 devices supported by the PSE 101. PSE 101 may use such information to generate day/time based usage data that maybe used by PSE 101 to refine PoE allocations. For example, if PSE 101 determines that certain PD 103 device enter a low power state after business hours and on weekends and holidays, PSE 101 may use that information when deciding whether to grant increases in PoE power from other PoE PD devices during those times.

It is noted that an PSE may maintain a PD power requirements lookup table that includes one or more predefined PD types, each predefined PD type having one or more power level states with predetermined power requirements. In one example embodiment the PSE is preconfigured with the PD power requirements lookup table during the manufacturing or installation process. In another example embodiment, the PSE builds the PD power requirements lookup table based on PD types, power level states, and predetermined power requirements reported by the respective PD devices supported by the PSE.

It is noted that the PSE port PDU data may be made available to network management applications executed by one or more network connected devices using communication protocols other than LLDP. For example, in one example embodiment, power management applications may retrieve allocated power and actual use power data from the respective PSE and PD devices using the simple network management protocol (SNMP).

It is noted that in some PD embodiments the PD may report to a PSE one or more of an explicit power requirement, an explicit positive incremental change in a power requirement, an explicit negative incremental change in a power requirement, a predefined power level that corresponds to a predetermined power requirement of which the PSE has been previously informed and/or has previously stored in a PD power requirements lookup table, as described above.

It is noted that a PD and a PSE may exchange PoE power related information using any desired standard, or non-standard communication protocol, and that such communication protocols are not limited to those used in the example embodiments describe above.

For purposes of explanation, in the above description, numerous specific details are set forth in order to provide a thorough understanding of the described PSE, PD, and approaches for managing PoE power delivered from a PSE to a PD. It will be apparent, however, to one skilled in the art that the described bias circuits and amplifier circuits may be practiced without these specific details. In other instances, well-known structures and devices are shown in block diagram form in order to avoid obscuring the features of the described amplifier biasing circuit.

While the described PSE, PD, and approaches for managing PoE power delivered from a PSE to a PD have been described in conjunction with the specific embodiments thereof, it is evident that many alternatives, modifications, and variations will be apparent to those skilled in the art. Accordingly, embodiments of the described intelligent PSE, intelligent PD, and approaches for intelligently managing PoE power, as set forth herein are intended to be illustrative, not limiting. There are changes that may be made without departing from the scope of the invention.

What is claimed is:

1. A power service equipment, comprising:
    a Power over Ethernet (POE) manager configured to monitor a status of a powered device that receives PoE power from the power service equipment, the PoE manager comprising
        an interface module configured to receive data transmitted from the powered device, and
        a power level module configured to determine a power requirement for the powered device based, at least in part, on data received from the powered device, wherein the power level module determines a reduced power requirement for the powered device in response to the interface module receiving data from the powered device indicating that the powered device has entered an idle state characterized by a reduced network communication transmission rate;
    a data store configured to store data related to power requirements of the powered device and periodically update the stored data using a link layer discovery protocol; and
    a PoE power source configured to adjust an amount of PoE power delivered to the powered device based on the determined power requirement.

2. The power service equipment of claim 1, wherein in response to the interface module receiving data from the powered device indicating that the powered device has entered a busy state characterized by an increased network communication transmission rate, the power level module determines an increased power requirement for the powered device.

3. The power service equipment of claim 1, further comprising:
    a supply control module configured to control the PoE power source to adjust the PoE power allocated to the powered device based on the determined power requirement.

4. The power service equipment of claim 1, further comprising:
    a detection module configured to (i) detect connection of the powered device to a PoE port of the power service equipment and (ii) determine an initial power level provided to the powered device prior to the power service equipment receiving data transmitted from the powered device.

5. The power service equipment of claim 1, wherein the interface module is configured to process link layer discovery protocol messages received from the powered device.

6. A powered device, comprising:
    a power converter configured to (i) receive PoE power from a power service equipment and (ii) use the received power to power the powered device based on an initial power level received from the power service equipment; and
    a PoE manager configured to monitor a status of the powered device, the PoE manager comprising
        a controller configured to receive a status update indicating a change in operational status of the powered device;
        an interface module configured to generate data based at least in part on the received status update indicating the change in operational status of the powered device, wherein the data is to be transmitted to the power service equipment from which the powered device receives power; and
        a power level module configured to determine a reduced power requirement for the powered device in response to the interface module receiving data from the powered device indicating that the powered device has entered an idle state characterized by a reduced network communication transmission rate; and
        a data store configured to store data related to power requirements of the powered device and periodically update the stored data using a link layer discovery protocol.

7. The powered device of claim 6, wherein the power level module is configured to determine a power requirement for the powered device based, at least in part, on the received status update indicating the change in operational status of the powered device.

8. The powered device of claim 6, herein the power level module is configured to determine a reduced power requirement for the powered device in response to a status update indicating a reduced power requirement for the powered device.

9. The powered device of claim 6, herein the power level module is configured to determine an increased power requirement for the powered device in response to a status update indicating an increased power requirement for the powered device.

10. The powered device of claim 6, wherein the interface module is configured to generate link layer discovery protocol messages for transmission to the power service equipment from which the powered device receives power.

11. A method for managing Power over Ethernet (PoE) power provided to a powered device by a power service equipment, the method comprising:
    monitoring a status of the powered device based on data transmitted from the powered device;
    determining a power requirement for the powered device based, at least in part, on the data received from the powered device;
    determining a reduced power requirement for the powered device in response to receiving data indicating that the powered device has entered an idle state characterized by a reduced network communication transmission rate;
    adjusting an amount of PoE power delivered to the powered device based on the determined power requirement;
    storing data related to power requirements of the powered device; and
    periodically updating the stored data using a link layer discovery protocol.

12. The method of claim 11, wherein response to receiving data indicating that the powered device has entered a busy state characterized by an increased network communication transmission rate, the power service equipment determines an increased power requirement for the powered device.

13. The method of claim 11, further comprising:
    detecting connection the powered device to a PoE port on the power service equipment and providing an initial power level to the detected powered device prior to the power service equipment receiving data transmitted from the powered device.

14. The method of claim 11, further comprising:
receiving data related to power requirements of the powered device in a link layer discovery protocol compatible message transmitted from the powered device.

* * * * *